Dec. 17, 1946.      R. A. BAUDRY ET AL      2,412,860
MECHANICAL SHOCK APPARATUS
Filed March 8, 1944      4 Sheets-Sheet 3

WITNESSES:
E. A. M'Closkey
E. H. Oberheim

INVENTORS
Rene A. Baudry, Frank C. Rushing
and John C. Fink.
BY Paul E. Friedemann
ATTORNEY INVENTORS
Rene A. Baudry, Frank C. Rushing
and John C. Fink.
BY
Paul E. Friedemann
ATTORNEY Patented Dec. 17, 1946

2,412,860

UNITED STATES PATENT OFFICE 2,412,860

MECHANICAL SHOCK APPARATUS

René A. Baudry, Wilkinsburg, and Frank C. Rushing and John C. Fink, Pittsburgh, Pa., assignors to Westinghouse Electric Corporation, East Pittsburgh, Pa., a corporation of Pennsylvania Application March 8, 1944, Serial No. 525,494

10 Claims. (Cl. 73—12)

This invention relates generally to apparatus for producing a mechanical shock and more particularly to apparatus adapted to administer a mechanical shock to various types of electrical equipment, turbine sets, pumps and other mechanical apparatus.

There are many considerations which must be made in designing mechanical shock equipment. Importantly, among these is the provision of an essentially stationary platform on which the equipment to be shock tested may be mounted. The necessity for such an expedient will be readily seen, for example, when a pump is to be shock tested. Ordinarily it is desired to determine the effect of mechanical shock on the operating characteristics of a particular piece of equipment. In the case of a pump the electrical connections are usually of a minor nature; the piping connections, however, present a more serious problem particularly if the pump is of fairly large capacity. In one type of mechanical shock apparatus, the platform on which the equipment to be shock tested is mounted, is lifted several feet above the floor and then permitted to drop freely. Piping connections made to equipment tested on such apparatus involves lengthy flexible connections and considerable inconvenience in the making of such connections. An advantage of the relatively stationary test platform resides in the fact that high speed motion pictures of the apparatus may be taken during the test. The behavior of the apparatus under test may then later be studied, thus measurably assisting the engineer in his decisions regarding apparatus, design and mountings. From the foregoing it is readily apparent that the more nearly stationary the equipment carrying or test platform is maintained the greater is the facility with which the test may be conducted and observed.

The characteristics of the vibrations resulting from mechanical shock vary largely according to the conditions under which certain equipment must operate. In the present instance it is desired to simulate the accelerations and motions imparted to such equipment resulting, for example, from a shell striking a section of armor plate or from an underwater explosion. Tests conducted under such conditions indicate that there is a wide range of frequencies of vibratory motion present, ranging from low frequency and large amplitude to high frequency and small amplitude. The low frequency vibrations are important to simulate since it is relatively easy by suitable resilient mounting to filter out the high frequency motions but the low frequency motions may not be filtered out unless such resilient mounting is excessively flexible and allows very large motions. Thus even resiliently mounted equipment must be made rugged enough to withstand the low frequency large amplitude motions which an impact produces.

Another important consideration particularly when the mechanical shock apparatus is of fairly large size, is the effect of the vibrations transmitted through the earth to the foundation of such device and to the structure or building in which it may be housed. The heavy low frequency vibrations produced may have a very destructive effect upon such structure.

It is, thus, one of the principal objects of this invention to provide a mechanical shock apparatus in which the platform supporting the equipment to be shock tested shall be movable only through a relatively small distance corresponding to the amplitude of the low frequency shock motion.

Another object of this invention is to provide a mechanical shock apparatus which has accelerations and motions of a character similar to those under which the equipment to be shock tested must operate.

Still another object of this invention is to provide a mechanical shock apparatus which largely prevents the transmission of vibrations to surrounding structures.

Other objects and advantages will become apparent from a study of the following specification when considered in conjunction with the accompanying drawings in which.

Figure 1:
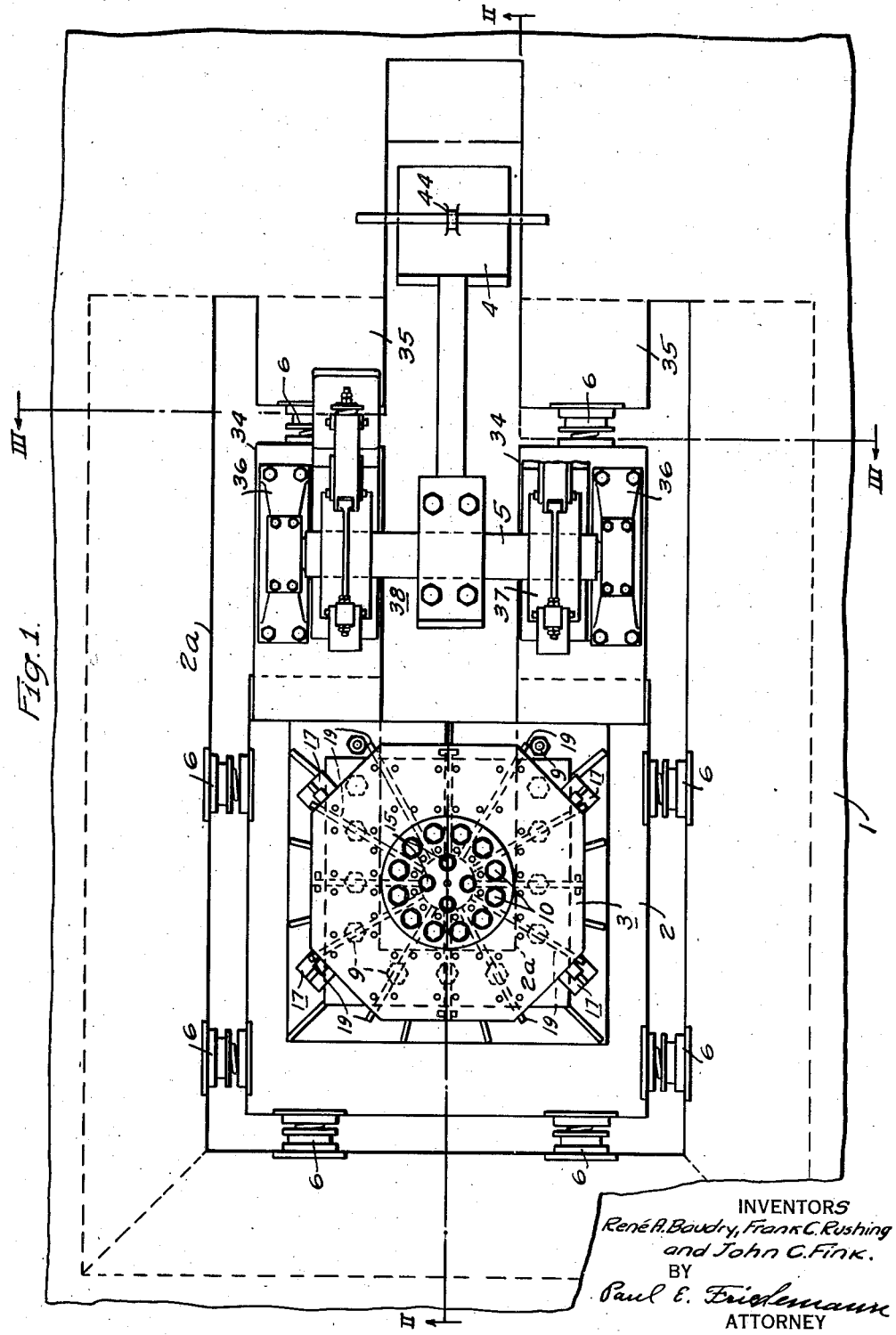
Fig. 1 is a plan view of a mechanical shock apparatus embodying the fundamental principles of this invention.
Figure 2:
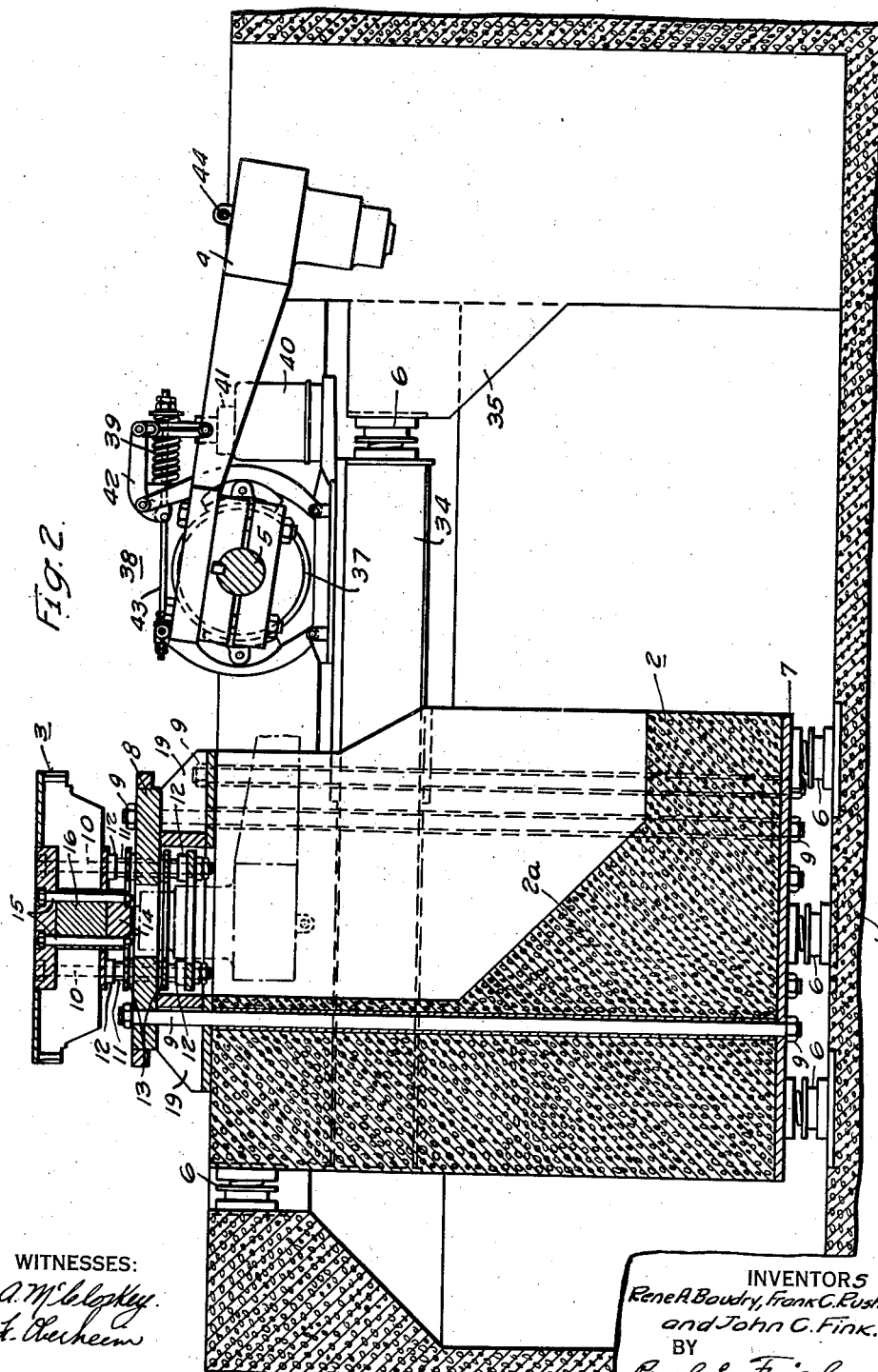
Fig. 2 is a sectional view taken longitudinally of the apparatus on the line II—II of Fig. 1.
Figure 3:
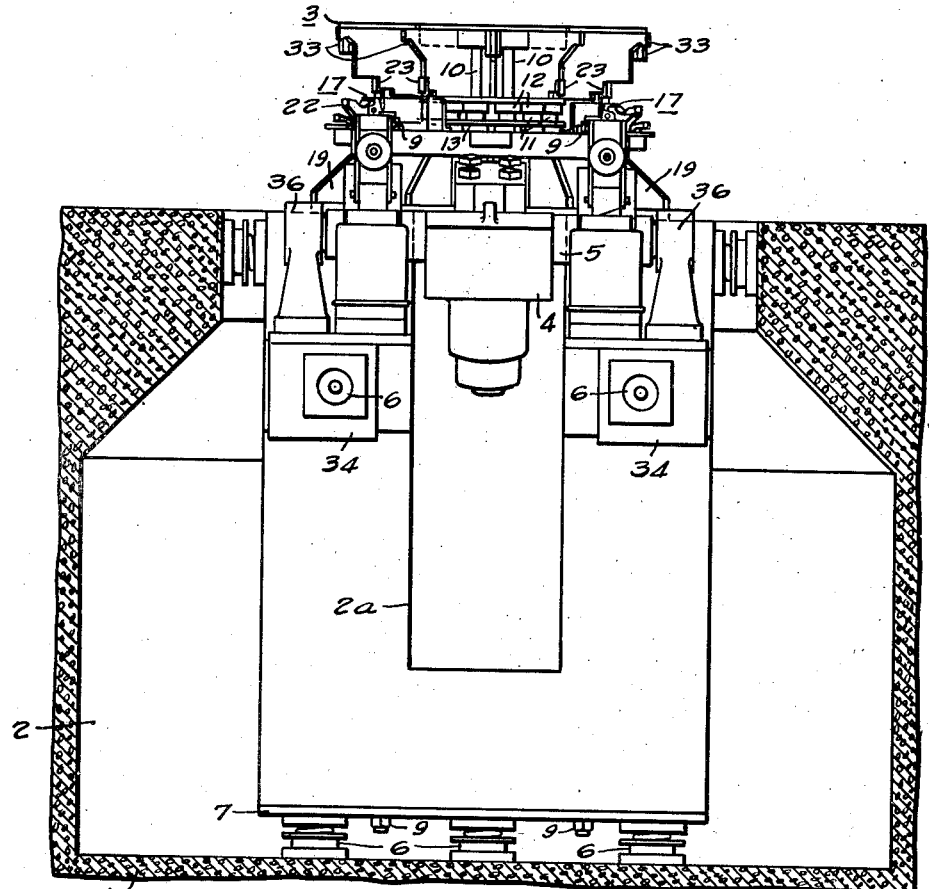
Fig. 3 is a sectional view taken transversely of the apparatus on the line III—III of Fig. 1.

The present invention will probably best be understood upon reference to Figs. 1, 2 and 3, particularly Fig. 2, by first considering the main elements of the apparatus by means of which the functions hereinbefore set forth are accomplished. To this end numeral 1 indicates the foundation on which is resiliently carried both vertically and transversely the mass 2 which mass has mounted thereon for limited vertical movement only a test platform 3 on which the equipment to be shock tested is mounted. A mass such as hammer 4 which is pivoted in a bearing on suitable extensions of the mass 2 swings through a maximum arc of substantially 270° about the axis of a shaft 5 from its uppermost vertical position to its position of impact against the underside of the platform 3. In this latter position the hammer is illustrated in dot-dash outline. Impact of the hammer against the underside of the platform accelerates the platform vertically to produce a low frequency vibration of the platform having an amplitude determined by the mechanical limits of vertical movement. In addition due to the rigidity of the structure of the test platform, a high frequency vibration is produced in the platform as will be hereinafter apparent. The vibrations of the platform and such apparatus as may be mounted thereon are essentially restrained by the mass 2 because of its high inertia. Such vibratory movement of the mass 2 as may occur is, because of its resilient mounting for the most part not transmitted to the foundation 1. Small movements of the mass 2 which may occur causes only a small change in the force applied to the foundation 1, because the spring deflection is small compared to the spring deflections due to the dead weight of mass 2.

While the foregoing covers generally the fundamental elements of the invention and their operation a more complete understanding of the invention may be had from a detailed description of the drawings.

The base or foundation 1 is generally of the form of a rectangular pit within which is carried on a plurality of coil spring supports 6, the mass 2. This mass is of poured reinforced concrete, but may be of any suitable material, and is faced along its lower surface with a plate 7 which in turn is carried upon the coil spring supports 6. The actual weight of the mass 2 is preferably some 40 to 60 times that of the hammer 4. As will be noted the hammer swings through an arc to strike the underside of the test platform 3. Since the test platform is mounted substantially vertically over the center of gravity of the mass 2 a suitable opening 2a is provided therein to clear the hammer. To the upper side of mass 2 a ribbed bedplate 8 of either fabricated or cast construction, is rigidly secured by means of a plurality of bolts 9 which extend entirely through the bedplate, the concrete mass and the bottom plate 7. The test platform 3 which is carried by the ribbed bedplate 8 is also of ribbed construction and is preferably sufficiently rigid to have a high natural frequency of vibration to simulate the high frequency vibrations occurring in the armor plate subjected to impact. It is secured to the ribbed bedplate 8 by means of a plurality of high strength bolts 10 which are rigidly secured in the platform and which below the platform, are provided with sleeves 11 and bushings 12; the sleeves extending completely through the bedplate 8 serve as guides for the vertical movements of the platform while the bushings 12 upon engagement with the rings 13 on either side of the bedplate limit such movement. The under surface of the platform is provided with a striking surface 14 preferably of heat-treated steel, which is supported on and spaced from a central section of the test platform by means of the bolts 15 and spacing block 16 which is a part of the platform.

Figure 6:
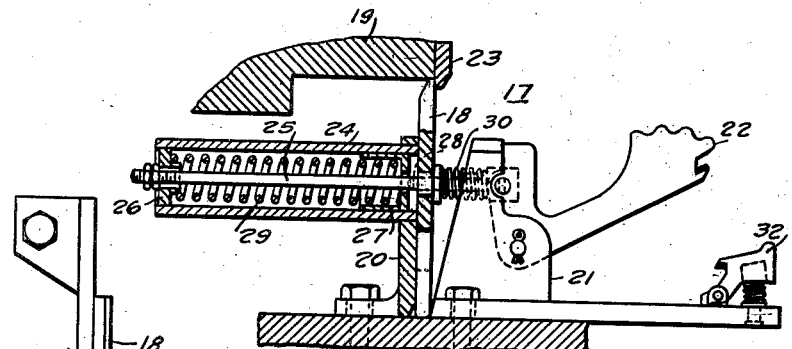
Figs. 6 and 7 are respectively a longitudinal cross section and a plan view of a latch mechanism embodied in the present apparatus.
Figure 7:
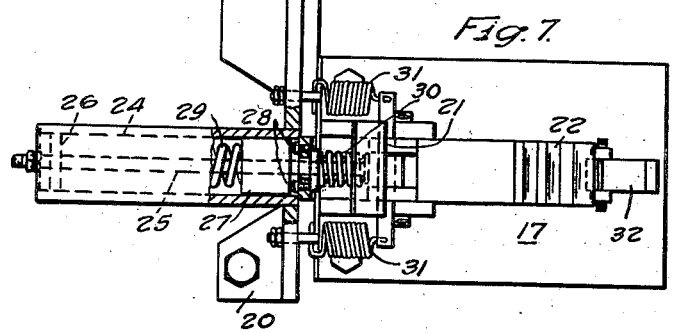

As shown in Fig. 2 the test platform is positioned substantially centrally of its limits of vertical movement. This again is to simulate an actual operating condition since under actual operating conditions the equipment is normally so mounted that vibratory motion occurs on either side of a central or neutral position. Thus by supporting the platform centrally of its movement as shown, a close approach to actual movement is attained. The means for so supporting the platform is shown only generally at 17 in Figs. 1 to 3 inclusive. The details of such means appear in Figs. 6 and 7. It is desirable although not absolutely necessary, that such supporting means interfere not at all with the free vibratory motion of the platform once it is accelerated by impact from beneath, of the hammer. The latch mechanism detailed in Figs. 6 and 7 fulfills such requirements and as will be seen from Fig. 1 four of these mechanisms are distributed around the test platform to provide support thereof at its central vertical position.

Each of these units 17 comprises a pair of substantially U-shaped latch elements 18 the upstanding side portions of which are disposed between the pairs of ribs 19 of the test platform and the bedplate 8 and arranged for pivotal movement about its edge resting on the bedplate between angular limits imposed by the bracket 20 secured to the bedplate and the yoke 21 which yoke pivotally carries the operating lever 22. The latch 18 once it is vertically set, is maintained in such position by the catch members 23 secured to the extremities of each of the pairs of ribs 19. Each supporting means hereinafter referred to as a latch mechanism 17 comprises a cylinder 24 which is secured in a horizontal position to the vertical side of the bracket 20 and has concentrically mounted therewithin a rod 25 which rigidly carries at its one extremity a washer 26 which slides within the cylinder upon axial displacement of the rod, and at its other extremity is pivotally secured to the operating lever 22 which upon angular displacement thereof axially operates the rod. Between washer 26 and a cylinder 27, also axially slidable within the cylinder 24 and which is maintained in the position shown by reason of its abutment against the stops 28 on the latch 18, is a compression spring 29 which in the position shown is substantially balanced against the compression spring 30 which also encircles the shaft or rod 25 but which is disposed between the latch member 18 and the operating lever 22 and, hence, in compression opposes the spring 29. The mechanism is biased to the position shown by means of the tension springs 31 shown for the sake of clearness only in Fig. 7 and connected between the bracket 20 and the operating lever 22. Clockwise movement of the operating lever 22 by the foot of the operator to engage its catch 32 displaces the washer 26 to the right of the cylinder 24 and since the latch 18 is restrained from movement angularly by its catch 23 and, hence, prevents movement of cylinder 27, the compression loading on the spring 29 is increased while at the same time the compression loading of spring 30 is decreased. An unbalanced force acting to the right is, therefore, exerted upon the latch 18 tending to pivot it angularly from beneath the ribs 19 against the yoke 21. If now all four of the latch mechanisms 17 about the table are so set and an impact imparted to the test platform by the hammer, the platform is accelerated vertically upwardly and the latch 18 is released from the catch 23 and is biased pivotally from beneath the pairs of ribs against the yoke 21 by the unbalanced spring force. The table then bounces freely between its mechanical limits of vertical movement. Upon elevating the table by means such as, for example, a crane connected to the hooks 33 provided in the extremities of the ribs of the test platform, or by other suitable elevating means, the latch element 18 of each latch mechanism 17 upon release of its operating lever 22 from its catch member 32, is biased to its vertical latching position by the tension springs 31. When the test platform is lowered the full load thereof is carried by the latch members 18.

As will be noted upon an inspection of Figs. 1, 2 and 3 the shocking element or hammer 4 is pivotally carried upon a pair of beams 34 which extend completely through and are rigidly secured within the concrete mass 2. Hence, the total weight of the mass 2 also includes the hammer 4 and its mounting. The extremities of the beams 34 are resiliently connected to abutment 35 provided in the foundation, by means of the resilient supports 6. As particularly well shown in Fig. 1 other such supports 6 are provided between the upper portions of the mass 2 and the foundation for the purpose of stabilizing or minimizing transverse oscillations of the mass. As best seen in Figs. 1 and 3 the extremities of the shaft 5 are journaled in bearings 36 which are supported upon the beams 34 and the hammer is secured centrally of the shaft. Brake drums 37 are provided on the shaft adjacent each of the bearings and form a part of the block brake assemblies 38. These brakes are each provided with a spring 39 for applying the braking pressure and an electromagnetic device 40 comprising a coil and a core or plunger 41 for releasing the pressure. A bell crank 42 which is pivotally connected to an extremity of a brake arm has its extremities connected to the brake rod 43 and to the plunger. Downward movement of the plunger upon energization of the electromagnet coil operates the bell crank clockwise as seen in Fig. 2 against the bias of spring 39 to increase the distance between the brake arm extremities and, hence, reduce the braking pressure on drum 37.

The brakes 38 are provided primarily to control the swinging movements of the hammer or mass 4. For example, if a crane hook is inserted through the eye 44 on the hammer 4 and the hammer then hoisted to its desired elevation the electromagnets or solenoids 40 may be deenergized and the brake set to permit releasing of the crane hook. Upon energization of the solenoid the brakes are released and the hammer swings freely through its arc to deliver a blow against the striking surface 14 on the under surface of the test platform 3. As the hammer then swings back, the brakes may again be applied to stop the swinging of the hammer at the peak or highest point of its return swing. The brakes are preferably of sufficient capacity to stop the hammer if for some emergency reason it is desired to stop its movement after it has been dropped.

It has been found that the brakes when used to hold the hammer elevated prior to its being dropped do not release fast enough to avoid interfering with the free fall of the hammer. Thus if it is desired to know beforehand the kinetic energy of the hammer at impact when released from a predetermined elevation computations based on a free fall of the hammer may not accurately indicate the actual kinetic energy. Under such conditions an automatic release mechanism may be attached to the crane hook and used to pick up the hammer. Upon release thereof the hammer then drops without inteference. Since any form of automatic release mechanism suitable for the purpose may be employed and since such mechanism per se forms no part of the present invention, it has neither been shown nor described in detail.

Figure 4:
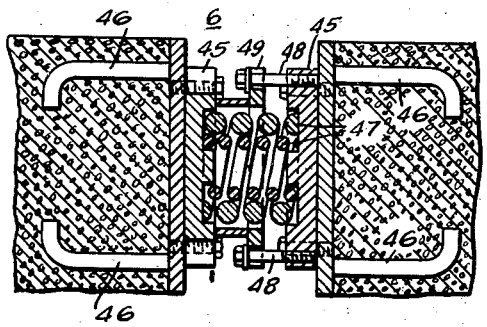
Figs. 4 and 5 are respectively longitudinal and transverse sections of a detail of the apparatus.
Figure 5:
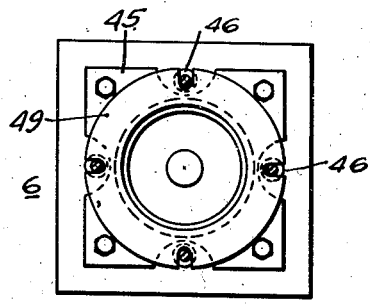

The details of the resilient supports 6 illustrated in Figs. 4 and 5 are believed to be fairly easily understood from the drawings. The supports each comprise a pair of base plates 45 having angle sections such as 46 suitably secured thereto. These angle sections hold the base plates in the concrete members. Compression springs 47 are disposed in circular seats formed in the confronting base plate surfaces. The assembly is held together and its extensions determined by bolts 48 which thread into one base plate and engage with their heads a flanged extension 49 of the opposite base plate.

On the basis of the foregoing description it is apparent that upon impact the test platform vibrates with a low frequency large amplitude motion between the mechanical limits of its vertical movement. At the same time the platform because of its construction vibrates with high frequency small amplitude motions which are its natural frequencies. In practice mounting adaptors are used between the platform and the apparatus to more nearly simulate ship conditions regarding intermediate frequencies and regarding flexibilities. The accelerations and motions of the test platform thus simulate to a large extent the vibratory motions of, for example, armor plate subject to the impact of a shot or shell.

Figure 8:
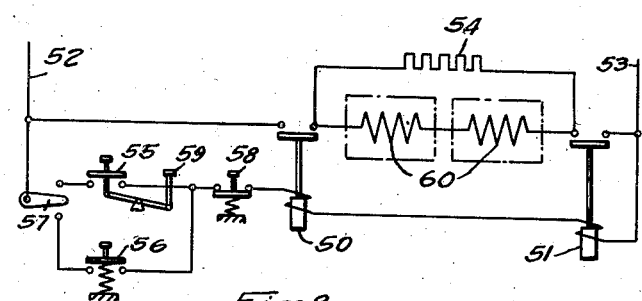
Fig. 8 is a diagrammatic circuit detail.

A form of circuit which may be employed to control the electromagnetic brake devices 40 is illustrated in Fig. 8. While this circuit per se forms no part of the present invention, it is presented for the purpose of more completely describing the operation of the invention.

The coils 60, there being one for each of the electromagnetic devices 40, are connected in series circuit relation, and through the medium of the back contact members of the contactors 50 and 51 are connected across the source of electrical energy indicated by the conductors 52 and 53. A discharge resistor 54 is permanently connected across the coils 60 to provide a discharge path therefore when the contactors 50 and 51 are deenergized to open the energizing circuit connections to the coils. Operation of the contactors 50 and 51 is controlled through the push button circuits including the parallel connected switch 55 and make push button switch 56 which are selectively connected to conductor 52 by the selector switch 57. The series connected break push button switch 58 is provided to interrupt the coil circuit of the contactors primarily in the event of failure to open either of switches 55 or 56. The purpose for providing the parallel connected switches 55 and 56 is mainly a matter of convenience for the operator, since under some testing procedures it may not be convenient to hold a switch such as 56 closed during the course of the shock tests to maintain the brakes in their off position. Under such circumstances the operator may connect the switch 55 in the circuit which switch once closed remains closed until its opening push button 59 is operated.

The descriptive disclosure hereinbefore made and the illustrations of the drawings are merely illustrative of a specific embodiment of this invention and are not to be interpreted in a limiting sense. The only limitations are to be determined from the scope of the appended claims.

We claim as our invention:

1. Mechanical shock apparatus comprising, in combination, a resiliently supported mass, a platform for supporting equipment to be subjected to mechanical shock, means securing said platform to said mass for providing limited movement of the platform relative to said mass, and a second mass arranged to strike said platform.

2. Mechanical shock apparatus comprising, in combination, a base, a mass resiliently supported on said base, a platform for supporting equipment to be subjected to mechanical shock, mounted for limited movement on said mass; and a second mass for striking said platform.

3. Mechanical shock apparatus comprising, in combination, a base, a mass resiliently supported on said base, a horizontal platform mounted for limited vertical movement relative to said mass, said platform being adapted to support equipment to be shock tested on the upper surface thereof, and a second mass disposed to strike the under side of said platform.

4. In a device for producing a mechanical shock, the combination of, a base, a mass resiliently disposed on said base, a platform, means for supporting said platform horizontally on said mass and providing limited movement thereof relative to said base, said apparatus being adapted to support on the upper surface thereof equipment to be subjected to a mechanical shock, and a second mass disposed to strike the under surface of said platform.

5. In a device for producing a mechanical shock, the combination of, a base, a mass resiliently supported on said base, a platform, means for horizontally securing said platform to said mass and allowing limited vertical movement of the platform relative to said mass, a second mass, a bearing, and means pendulously supporting said second mass in said bearing for pivotal movement through an arc terminating against the under surface of said platform.

6. In a device for producing a mechanical shock, the combination of, a base, a mass resiliently supported on said base, a platform, means for horizontally securing said platform to said mass and allowing limited vertical movement of the platform relative to the mass, a second mass, a bearing supported on the first mentioned mass, and means pendulously supporting said second mass in said bearing for pivotal movement through an arc terminating against the under surface of said platform.

7. In a device for producing a mechanical shock, the combination of, a base, a mass resiliently disposed on said base, a platform, means for horizontally securing said platform to said mass and allowing limited vertical movement of the platform relative to the mass, means for releasably supporting said platform whereby said platform is positioned substantially centrally between the limits of the vertical movement thereof, a second mass, a bearing supported on the first mentioned mass, and means pendulously supporting said second mass in said bearing for pivotal movement through an arc terminating against the under surface of said platform.

8. Apparatus of the character set forth in claim 7 in which said means for releasably supporting said platform comprises a plurality of latch members disposed between said first mentioned mass and said platform, and means for biasing said latch members to disengage said platform upon upward vertical movement of the platform by impact of said second mass.

9. In a device for producing a mechanical shock, the combination of, a base, a mass, means for resiliently supporting said mass on said base, a platform, means for securing said platform to said mass and allowing limited vertical movement only of the platform relative to said mass, means for releasably supporting said platform substantially centrally of its limits of vertical movement, a second mass, bearing means carried by the first mentioned mass, means pendulously supporting said second mass in said bearing means for pivotal movement through an arc terminating against the under surface of said platform, and means for stopping the pivotal movements of said second mass.

10. Apparatus of the character set forth in claim 9 in which said last mentioned means comprises a brake.

RENÉ A. BAUDRY.
FRANK C. RUSHING.
JOHN C. FINK.